United States Patent
Davis

(10) Patent No.: US 11,585,391 B2
(45) Date of Patent: Feb. 21, 2023

(54) CLUTCH ASSEMBLY

(71) Applicant: Clutch Industries Pty Ltd, Coburg North (AU)

(72) Inventor: Brad Davis, Coburg North (AU)

(73) Assignee: Clutch Industries Pty Ltd, Coburg North (AU)

( * ) Notice: Subject to any disclaimer, the term of this patent is extended or adjusted under 35 U.S.C. 154(b) by 0 days.

(21) Appl. No.: 17/383,811

(22) Filed: Jul. 23, 2021

(65) Prior Publication Data

US 2022/0025936 A1 Jan. 27, 2022

(30) Foreign Application Priority Data

Jul. 27, 2020 (AU) ................................ 2020902618

(51) Int. Cl.
  *F16D 13/71* (2006.01)
  *F16D 13/38* (2006.01)
  *F16D 13/70* (2006.01)

(52) U.S. Cl.
  CPC .......... *F16D 13/71* (2013.01); *F16D 13/385* (2013.01); *F16D 2013/706* (2013.01)

(58) Field of Classification Search
  CPC ... F16D 13/385; F16D 13/71; F16D 2013/706
  See application file for complete search history.

(56) References Cited

U.S. PATENT DOCUMENTS

| | | |
|---|---|---|
| 1,577,901 A | 3/1926 | Fawick |
| 1,665,554 A | 4/1928 | Kolb |
| 2,181,797 A | 11/1939 | Bateman |
| 3,129,570 A | 4/1964 | Ludwig |
| 3,465,860 A | 9/1969 | Gingery |
| 3,981,381 A * | 9/1976 | Nosek .................... F16D 13/72 192/70.14 |
| 4,057,131 A | 11/1977 | Flotow |
| 4,185,728 A | 1/1980 | Gatewood |
| 4,352,420 A | 10/1982 | Maycock |
| 4,446,955 A | 5/1984 | Lech, Jr. |
| 4,461,376 A | 7/1984 | Lech, Jr. et al. |
| 4,692,053 A | 9/1987 | Sampedro |
| 4,815,189 A | 3/1989 | Ijames et al. |

(Continued)

FOREIGN PATENT DOCUMENTS

| | | |
|---|---|---|
| CN | 105840685 A | 8/2016 |
| CN | 111207156 A | 5/2020 |
| KR | 20050020905 A | 3/2005 |

OTHER PUBLICATIONS

RXT Twin Disc (retrieved from internet on Aug. 18, 2021) <url:https://web.archive.org/web/20120226163945/http://mcleodracing.com/products/RXT+Twin+Disc.mcl > published on Feb. 26, 2012 as per Wayback Machine Related to US 2012/0181134.

(Continued)

*Primary Examiner* — David R Morris
(74) *Attorney, Agent, or Firm* — Womble Bond Dickinson (US) LLP

(57) ABSTRACT

A clutch assembly including a sealed clutch and a spacer. The clutch is connected to the spacer and the spacer is connectable to a flywheel along a common axis and the spacer facilitates connection of the clutch to the flywheel in at least two different axially spaced positions. A connection ring can connect the spacer connection to flywheel.

11 Claims, 10 Drawing Sheets

(56) References Cited

U.S. PATENT DOCUMENTS

| | | | |
|---|---|---|---|
| 4,941,557 | A | 7/1990 | Flotow |
| 5,333,712 | A | 8/1994 | Sabee |
| 5,954,552 | A | 9/1999 | Lauterbach |
| 6,557,687 | B1 | 5/2003 | Herchick |
| 7,770,704 | B1 | 8/2010 | Dumas |
| 2004/0195067 | A1 | 10/2004 | Friedrich et al. |
| 2005/0121282 | A1* | 6/2005 | Fox ...................... F16D 13/585 192/112 |
| 2006/0260900 | A1 | 11/2006 | Bassett |
| 2010/0130289 | A1 | 5/2010 | Uehara et al. |
| 2012/0181134 | A1 | 7/2012 | Roberts et al. |
| 2015/0240881 | A1 | 8/2015 | Bibby |
| 2018/0073569 | A1 | 3/2018 | Crespo et al. |
| 2022/0025934 | A1* | 1/2022 | Davis ................... F16F 15/315 |
| 2022/0025935 | A1* | 1/2022 | Davis ..................... F16D 13/38 |

OTHER PUBLICATIONS

International Search Report and Written Opinion for PCT/AU2021/050804 dated Aug. 26, 2021.
International Search Report and Written Opinion for PCT/AU2021/050805 dated Sep. 24, 2021.
International Search Report and Written Opinion for PCT/AU2021/050806 dated August6, 2021.

* cited by examiner

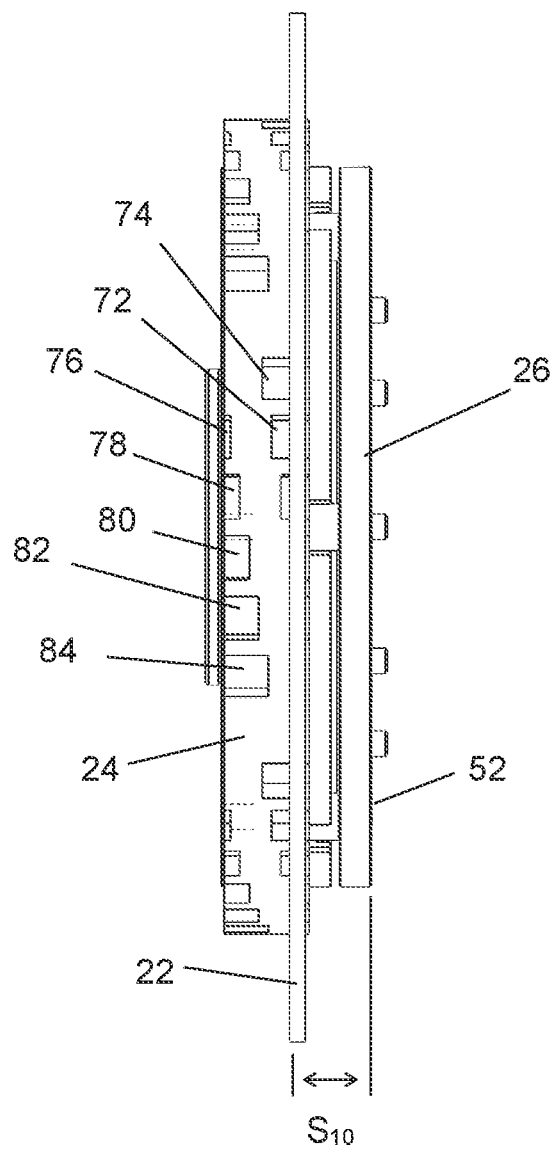
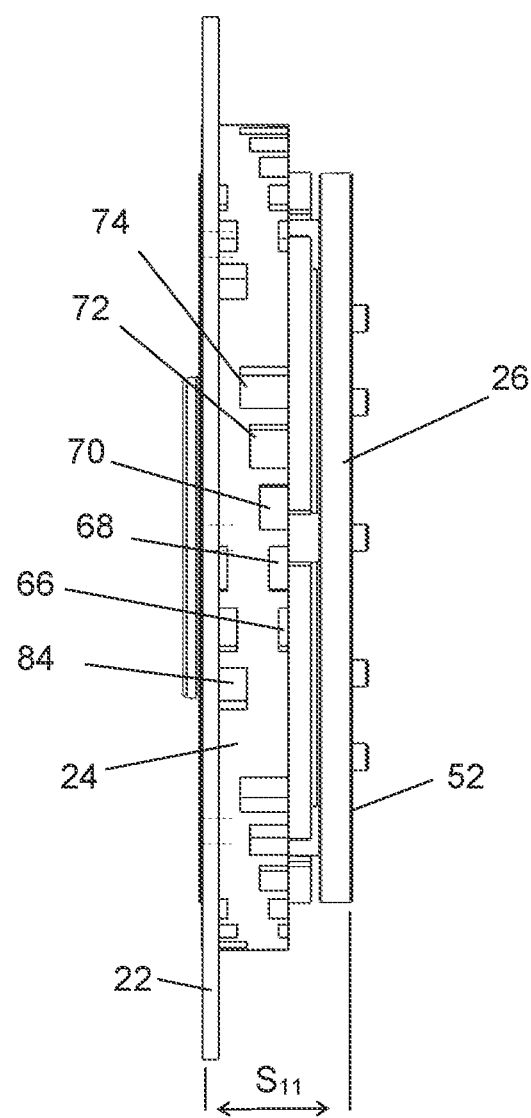

CLUTCH ASSEMBLY

PRIORITY CROSS-REFERENCE

The present application claims priority from Australian Provisional Patent Application No. 2020902618 filed 27 Jul. 2020 the contents of which is to be considered to be incorporated into this specification by this reference.

TECHNICAL FIELD

The present invention relates to a clutch assembly for an automotive vehicle and more particularly to a clutch assembly that can be mounted to multiple different flywheels of a vehicle engine. The clutch assembly can thus be termed as a "universal" clutch assembly in that the clutch assembly of the present invention facilitates attachment of one form of clutch universally to multiple different forms of flywheels.

BACKGROUND OF INVENTION

The discussion of the background to the invention that follows is intended to facilitate an understanding of the invention. However, it should be appreciated that the discussion is not an acknowledgement or admission that any aspect of the discussion was part of the common general knowledge as at the priority date of the application.

Vehicle manufacturers are continuously innovating and optimising vehicle components in order develop new and improved vehicles. Amongst the components that are targeted for optimisation or re-design is the clutch assembly that connects between the vehicle engine and transmission. In particular, when manufacturers release a new vehicle, the clutch system is typically different to the outgoing model. Over the past 70 years, vehicle manufacturers have developed over 5000 different clutch configurations for different vehicles. The applicant itself stocks over 4000 different clutch kits that are used for replacement of worn or damaged clutches.

As vehicle manufacturers seek increases in engine torque output, fuel economy and improvements in noise, vibration, and harshness (NVH), the clutch assembly is often modified or re-designed. Clutch assemblies are gradually becoming more complex to be able meet vehicle performance standards. It is expected that the increased complexity in clutch assemblies will see the cost of the average clutch system manufactured increase approximately 45% from USD$171 as at 2018 to approximately USD$250 by 2025.

Existing clutch kits (kits of parts that form a clutch assembly, including friction disc, pressure plate, diaphragm etc.) are not considered to be particularly versatile and can only be applied to a very limited number of vehicles. Of the currently available clutch kits, approximately only 260 kits can fit onto more than 10 different vehicles. The lack of cross-vehicle compatibility of clutch kits provides a burden on inventory management for manufacturers and suppliers. Typical installers do not have the capacity (either in terms of space or money) to carry the enormous inventory required to be able to replaces clutches across a wide range of vehicles. Manufacturers, suppliers and installers are therefore heavily reliant on expedited freight systems to be able to promptly provide customers (the installers) with replacement kits for specific vehicles when the clutch of that vehicle requires replacement.

Repair rather than full replacement of a clutch is rarely an option given that, due to the large cost and inconvenience associated with attending an automotive workshop to deal with clutch issues, vehicle owners usually run the clutch assembly to failure before having a mechanic replace it. But this results in a significant repair activity, involving raising the vehicle on a hoist, removing various parts of the vehicle drivetrain including the clutch, ordering and thereafter installing a new clutch and replacing the remaining drivetrain parts. Moreover, it is usually necessary for the vehicle to be assessed first, to establish that the existing clutch does need to be replaced and so before a clutch kit is ordered, the vehicle usually needs to be raised on a hoist and if the decision is to replace the clutch often the vehicle will be left on the hoist while the new clutch is ordered and delivered. The vehicle thus tends to occupy valuable space and equipment in the automotive workshop (automotive workshops tend to have limited numbers of hoists) over at least two days (but often more where delivery of the new clutch is delayed or where delivery is to rural or remote locations), while the vehicle owner is inconvenienced by having the vehicle off the road for an extended period of time, often having to rent a replacement vehicle until their own vehicle is repaired. Because of this, manufacturers and suppliers have established elaborate and expensive inventory and logistic networks to expedite the delivery of clutch kit orders. The establishment of these inventory and logistic networks require significant capital expenditure in addition to ongoing running costs.

As there exists a large number of clutch kits, it is common for an installer to mistakenly order a clutch kit that is incompatible with the particular vehicle being repaired, or with the particular vehicle model. This contributes to additional supply chain expenses to the supplier, the mechanic and the customer given that the wrongly ordered clutch kit must be returned and the correct clutch kit delivered. Moreover, given the vast number of clutches currently in use, it is often the case that mechanics and suppliers encounter delays and difficulty in sourcing the correct clutch kit.

Further, as each clutch kit is to be fitted to a certain alignment and configuration, installers are required to diligently review installation specifications, and manufacturers are required to provide installers and suppliers with support through training sessions and instruction manuals. Where an installer is unable to align a clutch to the specified configuration, the life of the new clutch can be significantly compromised, and may potentially cause damage to surrounding vehicle components, i.e. the engine on one side of the clutch and the transmission on the other side.

As part of the replacement of a clutch, the flywheel attached to the crankshaft of the engine will also be assessed for wear or damage. This occurs because traditional clutches frictionally engage a surface of the flywheel for torque transmission. That flywheel surface almost always needs to be refurbished by re-grinding and so this adds to further time and expense in removing the flywheel and in sending it for grinding.

The useful life of a standard clutch is approximately 100,000 kilometres. As the average life of a vehicle is 250,000 kilometres, at least two clutch replacements are inevitable. As explained above, the process to change a clutch is labour intensive and time-consuming and can take approximately two to four days to complete. Throughout this time the vehicle owner will be without their vehicle and the automotive workshop will have the vehicle occupying garage space and resources while dormant.

For at least the forgoing reasons, the applicant has proceeded to develop new clutch assemblies with the intention to mitigate or eliminate some or all of the onerous aspects of a conventional vehicle clutch replacement. In particular, the applicant considers there to be a need for a new form of clutch assembly which can be fitted to more than one type of vehicle so that a specific form or type of clutch assembly is not required for each different vehicle or each small group of vehicles.

SUMMARY OF THE INVENTION

According to the present invention there is provided, a clutch assembly comprising:
a sealed clutch, and
a spacer,
the clutch being connected to the spacer and the spacer being connectable to a flywheel along a common axis and the spacer facilitating connection of the clutch to the flywheel in at least two different axially spaced positions.

A sealed clutch as referred to above and throughout this specification is a clutch which does not frictionally engage the face of a flywheel. In some forms, the clutch has a base and a pressure plate and an intermediate plate between them and the friction linings of a clutch plate are positioned on either side of the intermediate plate. In other forms, the clutch could have just a single friction lining between a base plate and a pressure plate and no intermediate plate, or it could have more than two plates, such as three or four plates (known as triple or quad clutches). The clutch plates drive a transmission shaft and the pressure plate is axially movable within the clutch to frictionally engage and disengage the clutch plates. Sealed clutches can also be modular clutches and in certain regions are also known as 'pre-assembled' clutches. In addition, clutch plates are also known as clutch discs and so the use of "plate" and "disc" in this specification is interchangeable should be considered to be referring to the same item of a clutch.

Many of the benefits provided by the present invention occur because traditional clutch assemblies are sized and configured to fit a particular flywheel, and to fit within a particular area or envelope between the flywheel and the transmission. Accordingly, existing clutch assemblies have different flywheel mounting holes and depth or height dimensions, in order that the clutch be mounted correctly to the flywheel and extend the appropriate distance for connection to the transmission. Uniquely, a sealed clutch is not required to engage the flywheel for torque transmission and by the use of a spacer, the clutch of the clutch assembly can be spaced relative to the flywheel to fit within the particular clutch envelope of the vehicle being repaired and this advantageously means that one form of clutch can be employed in a variety of different vehicles with different clutch envelopes.

Specifically, the spacer provides for spacing variation (i.e. variation in the distance or spacing between the flywheel and the clutch), by providing at least two mounting positions for the clutch relative to the flywheel. This enables the sealed clutch (hereinafter simply referred to as a clutch) of the clutch assembly of the invention to be "raised" or "lowered" to the height of the original clutch that is being replaced. This advantageously enables the present invention to employ one form of clutch across a plurality of vehicles. Moreover, the clutch that is installed in a vehicle can be of an improved type, or at least a different type, that is not otherwise installable in a particular vehicle. For example, a single disc clutch that is supplied as original equipment with a vehicle, might be replaced by a twin disc or triple disc clutch for improved performance or longevity. The benefit here is that the vehicle owner has more choice than previously, because previously, the vehicle owner was limited to the particular clutch that fitted the vehicle. By use of the present invention, the vehicle owner can not only choose to replace the previous clutch with a clutch having generally the same performance and longevity, but the vehicle owner can alternatively select a different clutch for the replacement, which might be cheaper, of higher performance, or of greater longevity. The vehicle owner now has a choice that might not have been available in the past.

A clutch assembly according to the present invention thus advantageously facilitates adjustment of the position of the clutch relative to the flywheel in at least two different positions. This adjustment means that a clutch that would not fit the space or envelope between the flywheel and the transmission, has an alternative position, spaced towards or away from the flywheel and thus towards or away from the crankshaft or the transmission, that might allow the clutch then to fit. In this example, the clutch assembly according to the invention can thus fit in at least two vehicle configurations rather than one. In alternative forms of the invention, the spacer facilitates connection of the clutch to the flywheel in three or more different axially spaced positions, whereby an even greater number of vehicle configurations can be accommodated by the one clutch assembly.

The above stated advantage means that a reduced number of clutch kits need to be manufactured, stored and delivered. This will have an advantageous effect in reducing costs for manufacturing (less different component parts will be needed), storage space, delivery and will reduce the amount of errors made during selection and ordering of clutch kits. Moreover, it is more likely that automotive workshops will be able to carry stock that will allow them to have suitable clutch parts on hand whereby an order and subsequent delivery of parts is not required. This would facilitate better scheduling of clutch repairs so that replacement of a clutch could take place on the day the vehicle is provided to the automotive workshop, with all the associated benefits to both the customer and the workshop.

According to some forms of the invention, the spacer is formed as a ring. This provides consistency with flywheels and clutches that have circular formations and a ring spacer can thus provide for an even distribution of load during operation of vehicle. The formation of the spacer as a ring also means that the spacer can be a single part rather than comprising multiple or separate parts.

A ring spacer can thus have an inside generally cylindrical surface and can also an outside generally cylindrical surface and opposite axial facing leading and trailing surfaces. If the spacer is not formed as a ring, the spacer can still have an inside generally cylindrical surface, but the outside surface can have a different shape, such as square. The flywheel can be connectable to the leading surface of the spacer and the leading surface or the trailing surface can have a configuration that facilitates connection of the clutch to the flywheel in at least two different axially spaced positions. Accordingly, the axial distance between the clutch and the flywheel can be adjusted to suit the particular clutch and flywheel being coupled.

Axial spacing of the clutch relative to the flywheel can be achieved by the clutch being mounted or received or receivable within the opening defined by the inside generally cylindrical surface of the spacer, whereby the clutch can be mounted to the spacer within, or partially within the opening in at least two axially spaced positions. For this, the trailing surface of the spacer can have a configuration that facilitates connection of the clutch to the spacer in at least two different axially spaced positions relative to the spacer. The leading surface of the spacer can also have a configuration that facilitates connection of the clutch to the flywheel in additional axially spaced positions and in this respect, both of the leading and trailing surfaces of the spacer can include configurations that facilitate connection of the clutch to the flywheel in different axially spaced positions.

In some forms of the invention, the clutch assembly can further include a connector, which can be interposed between the spacer and the flywheel for connecting the spacer to the flywheel. This arrangement is expected to allow the spacer, and ultimately the clutch assembly to connect to a wider variety of flywheels and ultimately facilitate use of a clutch assembly according to the invention to be employed with a wider variety of vehicle models. To add to the versatility of the assembly, the connector may have a variety of fitment configurations to accommodate fitment to a number of flywheel designs. The connector can be a connection ring.

Where the spacer is formed as a ring as previously described hereinbefore, in which it includes an inside generally cylindrical surface and an outside generally cylindrical surface and opposite axial facing leading and trailing surfaces, or where the spacer is formed to include an inside generally cylindrical surface and an outside non-cylindrical surface and opposite axial facing leading and trailing surfaces, the connection ring can be connected to the leading or trailing surface of the spacer. The leading or trailing surface to which the connection ring is connectable can have a configuration that facilitates connection of the spacer to the flywheel in at least two different axially spaced positions relative to the spacer. The inclusion of the connection ring can allow the clutch assembly to be applied to a wider variety of flywheel designs. For example, with one model of flywheel, the spacer might connect directly to the flywheel so that no connection ring is required. However, for an alternative model flywheel, the same spacer might connect indirectly to the flywheel via the connection ring. Thus, a mechanic fitting a new clutch can fit the same clutch and spacer to two different models of flywheel by either fitting the spacer directly to a flywheel, or using the connection ring to connect the spacer to a different flywheel. Moreover, the connection ring can also include multiple connection formations that allow the connection ring to connect to different forms or styles or models of flywheel. The addition of the connection ring to the clutch assembly thus provides the invention with significant flexibility in the connections to different flywheels, thus meeting the aim to facilitate a reduction in the inventory required to service the wide variety of flywheels that are currently in use.

As indicated above, the connection ring can be connectable to either of the leading or trailing surfaces of the spacer. Moreover, the leading and trailing surfaces can each have a configuration that facilitates connection of the spacer to the flywheel in at least two different axially spaced positions. This advantageously will allow the clutch assembly of the invention to provide further options for the position of axial mounting of the clutch relative to the flywheel. For example, where each of the leading and trailing surfaces is configured to provide connection of the spacer to the flywheel in at least two different axially spaced positions, the clutch assembly thus provides at least four different positions at which the clutch can be axially positioned relative to the flywheel, by the leading surface providing two different axially spaced positions and the trailing surface providing two further and different axially spaced positions with the different axially spaced positions being accessed by selecting either of the leading and trailing surfaces for connection to the flywheel.

Each of the leading and trailing surfaces of the spacer has an outer surface and the configuration that facilitates connection of the spacer to the flywheel in at least two different axially spaced positions can comprise one or a plurality of connection recesses, slots, grooves, voids or openings (hereinafter "connection recesses") that extend axially inboard of one or both of the respective outer surfaces and that have a first axial depth. Connection of the spacer to the flywheel can be by the connection ring connecting to the spacer to the outer surface of the spacer at a first axial position relative to the spacer, or to one or more of the connection recesses at a second and different axial position. The two different positions alter the axial position of the spacer relative to the flywheel and thus alter the axial position of the clutch relative to the flywheel. Where a connection recess or connection recesses are provided in each of the respective outer surfaces of the leading and trailing surfaces, the spacer can provide additional and different axially spaced positions of the clutch relative to a flywheel. The connection ring can thus be connected to the outer surface of the spacer, on either the leading or trailing surfaces of the spacer, or inboard of the outer surface to the connection recess or recesses of the spacer in either the leading or trailing surfaces of the spacer, whereby the selected connection provides a different axial spacing of the clutch relative to the flywheel.

The reference to axial spacing as made herein throughout, is a reference to adjustment of the position of the clutch relative to the flywheel along the axis on which the flywheel and clutch assembly are coaxial. Moreover, reference to the axially inboard extension of the connection recesses slots, grooves, voids or openings is also a reference to the connection recesses slots, grooves, voids or openings extending inwardly of the outer surfaces of the leading and trailing surfaces in a direction along the axis. For example, a connection recess extending axially inboard from the leading surface extends axially towards the trailing surface.

Alternatively, the configuration that facilitates connection of the spacer to the flywheel in at least two different axially spaced positions may comprise a plurality of connection recesses extending inboard of at least one of the respective outer surfaces of the leading and trailing surfaces of the spacer, whereby a first connection recess or a first set of connection recesses has a first axial depth and a second connection recess or a second set of connection recesses has a second axial depth. The sets of connection recesses can comprise two or more connection recesses and in some forms of the invention, each set of connection recesses comprises six connection recesses. The connection ring can connect to the connection recesses of the spacer in any suitable manner for connection of the connection ring to the spacer and may include projections, connectors or lugs (hereinafter "lugs"). Connection of the connection ring to the spacer can be made to the first connection recess or set of connection recesses at a first axial spacing relative to the spacer or to the second connection recess or set of connection recesses at a second axial spacing relative to the spacer. The connection lugs of the connection rings can be of complementary shape to the shape of the connection recesses so that the lugs are a snug or close fit within the connection recesses, thus resisting lateral movement within the connection recesses and ensuring that the lugs are able to be securely located in the recess or recesses. The connection lugs and the connection recesses can include openings to accept threaded fasteners to secure the connection lugs within the connection recesses.

In some forms of the invention the connection recesses of the sets of connection recesses may be spaced apart equidistantly about the outer surfaces of the leading and/or trailing surfaces of the spacer. Further, the spacer can include two, three, four or five different sets of connection recesses of different axial depth, or as many different sets as can practically fit on the spacer. Each connection recess of each set of connection recesses can be grouped together with a connection recess of each other set to form groups of connection recesses of different axial depth. That is, where five different sets of connection recesses of different axial depth are provided in one or both of the leading and trailing surfaces, groups or groupings of five different axial depth connection recesses can be formed. That is, the five different axial depth connection recesses can be grouped together. The groups can be arranged with the respective connection recesses side-by-side and progressively increasing or decreasing in axial depth. Thus, the connection recesses of each group may be placed adjacent each other from shallowest axial depth to deepest axial depth.

The spacer described above can provide a simple method of selecting a different axial spacing between the flywheel and the clutch. The method can involve a slight rotation of the connection ring relative to the spacer to select the correct connection recess or set of connection recesses that the connection ring is to connect to for the desired axial position. If the connection ring is incorrectly connected to a set of connection recesses of a first axial depth, it is simply a matter of withdrawing the connection ring from the incorrect connection recesses and rotating the connection ring to engage the correct connection recesses. The rotation might be through approximately 30° depending on the spacing of the connection recesses within the group of connection recesses.

As indicated above, the connection lug or lugs can be connected to the outer surface of the leading and trailing surfaces as well as to the connection recesses inboard of the outer surfaces. The connection ring can thus have an inside generally cylindrical surface or edge and an outside generally cylindrical surface or edge and the lug or lugs can extend radially inwardly from the inside surface or edge. In some forms of the invention, six lugs are provided.

As indicated above, the connection recesses can be formed in each of the leading and trailing surfaces of the spacer. The axial depths of the connection recesses of the leading surface can be the same, or different to the axial depths of the connection recesses of the trailing surface. Where the axial depths of the connection recesses of the leading and trailing surfaces differ, all of the connection recesses of the leading surface can have different axial depths to the axial depths of the connection recesses of the trailing surface, or alternatively, some of the connection recesses of the leading surface can have different axial depths to the axial depths of the connection recesses of the trailing surface. By having connection recesses in each of the leading and trailing surfaces of the spacer, the clutch assembly can be arranged to provide at least ten options at which a clutch can be axially positioned relative to the flywheel. This increases the number of vehicles that the clutch assembly of the invention will be able to be installed in.

Where connection recesses are formed in the leading and trailing surfaces and are arranged in groups of different axial depth that progressively increase or decrease in axial depth, in some forms of the invention, groups in the leading surface can overlie or oppose groups in the trailing surface and the progression from shallowest axial depth to deepest axial depth in the leading surface can be opposite to that in the trailing surface, so that connection recesses having greater axial depth in one of the leading and trailing surfaces are opposed to connection recesses having shallower axial depth in the other of the leading and trailing surfaces. This enables the axial depth or height of the spacer to be minimised, by the shallowest connection recesses overlying the deepest connection recesses. Where the connection ring can connect to the leading and/or trailing surfaces of the spacer as well as to connection recesses formed in the leading and trailing surfaces, connection openings can be provided in the outer surfaces of the leading and/or trailing surfaces for connection of the connection ring and the arrangement can be that deepest connection recesses are axially opposed to the connection openings in the leading and trailing surfaces and the next deepest connection recesses are axially opposed to the shallowest connection recesses and so on.

The connection recesses of the spacer can be open through the outside generally cylindrical surface of the spacer so that the inside surface of the connection ring can fit closely about the outside surface of the spacer and the lugs of the connection ring can directly enter the connection recesses. This enables the connection ring and the lugs to be planar and easily manufactured from plate metal, such as plate steel.

To securely attach the clutch to the spacer, the clutch can include radially outwardly extending projections, connectors or lugs (hereinafter "lugs") that extend to overlie the trailing surface of the spacer for connection to the spacer. Alternatively, the clutch can include radially outwardly extending lugs and the spacer can include connection recesses that open through the inside generally cylindrical surface of the spacer which accept the lugs for connection of the clutch to the spacer. These connection recesses can take the form of the groups of connection recesses discussed that have different axial depths through the trailing surface of the spacer. This enables the clutch to connect to the spacer at different relative axial positions and with the connection ring also being connectible to the spacer at different relative axial positions, adds further options for the axial position of the clutch relative to the flywheel, using the one spacer. In some forms of the invention, the spacer can connect directly to the flywheel and the variation in axial spacing between the clutch and the flywheel is by the clutch connection to the spacer.

In an alternative form of the invention, the spacer can comprise a plurality of separate spacer elements or blocks that connect between the clutch and the connector or between the connector and the flywheel. This form of the invention is applicable where the provision of a spacer as a ring cannot be used, such as where the space available for the spacer is not sufficient for the ring form of spacer. The plurality of separate spacer elements will comprise at least first spacer elements having a first spacing dimension and second spacer elements having a second spacing dimension, whereby the first or second spacer elements are separately selected for use based on the axial spacing dimension required between the clutch and the flywheel. The provision of the first and second spacer elements thus facilitates connection of the clutch to the flywheel in at least two different axially spaced positions.

The plurality of separate spacer elements can comprise additional spacer elements having additional spacing dimensions, such as three, four, five, six or more spacer elements.

In this form of the invention, the connector can be interposed between the spacer elements and the flywheel for connecting the spacer elements to the flywheel, or the spacer elements can be interposed between the connector and the flywheel.

As in forms of the invention described above, the connector can be a connection ring.

A clutch assembly according to the invention can also be provided as a kit in which the kit includes a sealed clutch, a spacer of any of the kinds described above. The kit can also include a connector of any of the kinds described above.

It will be appreciated that the present invention has been described in relation to a clutch assembly, but the invention also extends to a spacer for use in a clutch assembly, in which the spacer is operable to connect to a clutch and to a flywheel along a common axis and the spacer facilitating connection of the clutch to the flywheel in at least two different axially spaced positions. For this, the spacer can be formed as a ring and have an inside generally cylindrical surface and an outside generally cylindrical surface and opposite axial facing surfaces. A clutch can be connectable to one of the axial facing surfaces and a flywheel can be connectable to the other of the axial facing surfaces, whereby the axial facing surfaces of the spacer have a configuration that facilitates connection of the spacer to the flywheel in at least two different axially spaced positions.

BRIEF DESCRIPTION OF THE DRAWINGS

In order that the invention may be more fully understood, some embodiments will now be described with reference to the figures in which:

FIGS. 10 and 11 are side views respectively of the clutch assemblies of FIGS. 8 and 9

DETAILED DESCRIPTION OF THE DRAWINGS

Figure 1:
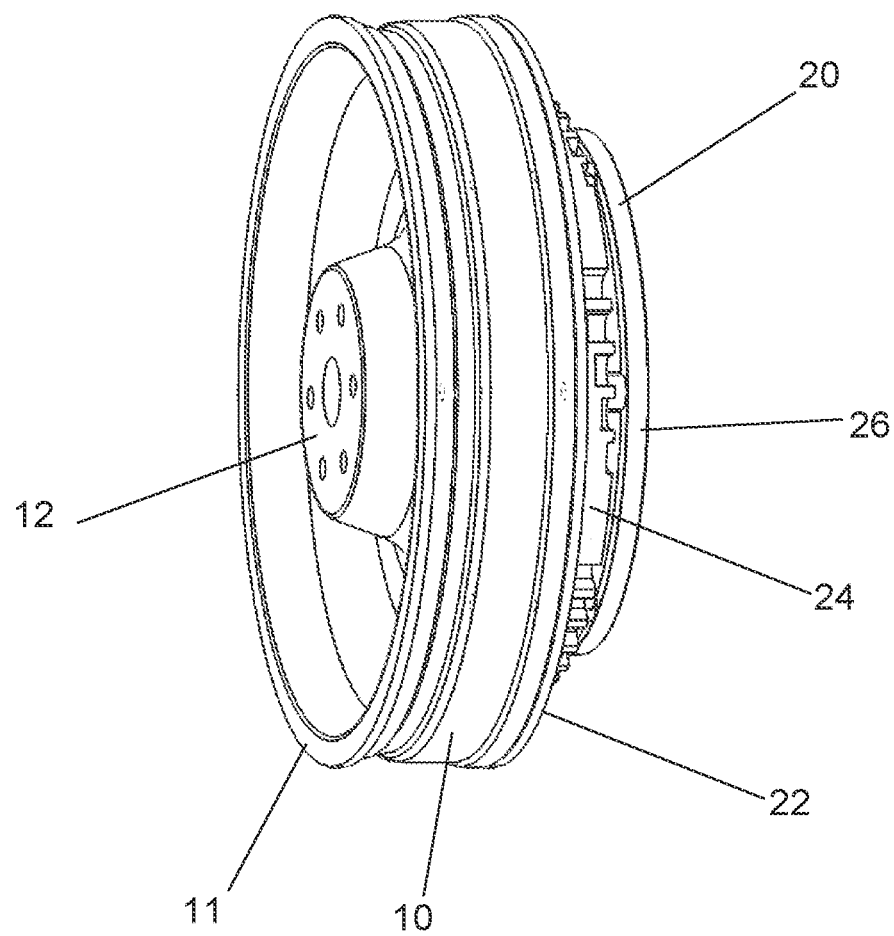
FIG. 1 is a perspective view of a flywheel to which a clutch assembly according to the present invention is connected.

FIG. 1 is a perspective view of a flywheel 10 to which a clutch assembly 20 is connected. The flywheel 10 includes an outer ring 11 within which the majority of the weight of the flywheel 10 is concentrated. The flywheel 10 connects to the crank shaft of an engine, while the clutch assembly 20 connects to the transmission shaft of an automotive transmission. The clutch assembly 20 is of the kind that is described in two co-pending patent applications that the present applicant has filed simultaneously with the present application. The content of the specifications of Australian Provisional patent applications 2020902617 and 2020902619 is to be considered to be incorporated into this specification by this reference.

Figure 2:
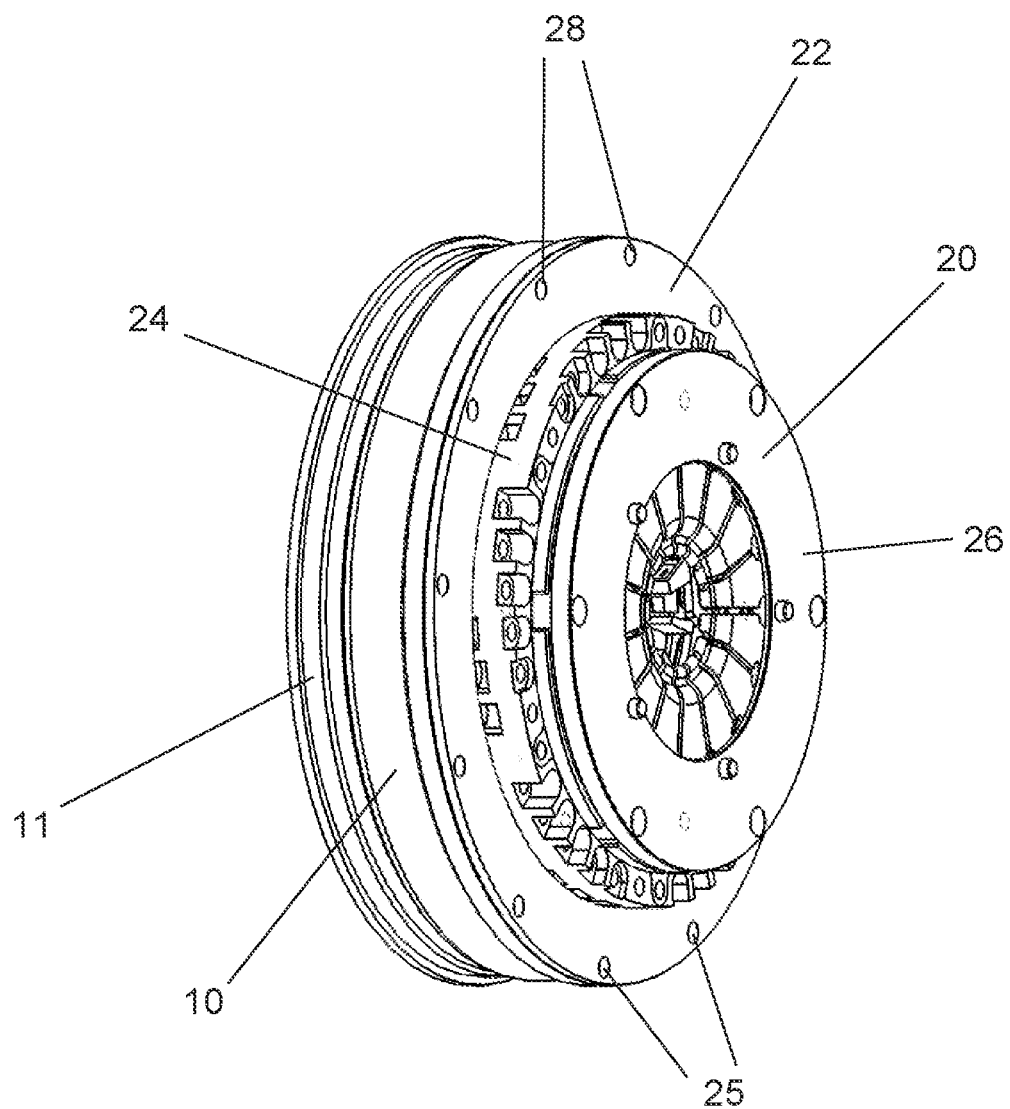
FIG. 2 is a different perspective view of the FIG. 1 arrangement.

FIG. 2 shows the arrangement of FIG. 1 from the opposite perspective and this shows the clutch assembly 20 in more detail. The clutch assembly 20 includes a connection ring 22 in connection with the flywheel 10, a spacer 24 and a clutch 26. The clutch assembly 20 thus varies from existing clutch installations, in which the clutch would connect directly to the flywheel. In the present invention, the clutch connects to the flywheel either directly via the spacer 24, or via a combination of the spacer 24 and the connection ring 22.

The clutch 26 of the clutch assembly 20 is a sealed clutch (which will become more apparent in the description that follows) that, as explained earlier herein, is not required to engage the flywheel 10 for torque transmission. This allows the spacing of the clutch 26 to be adjusted axially relative to the flywheel 10 in order to fit within the operating space that is available for the particular vehicle in which the clutch assembly 20 is being installed. Advantageously, this allows the one clutch assembly 20 to fit into the various different available spaces of different vehicles.

Figure 3:
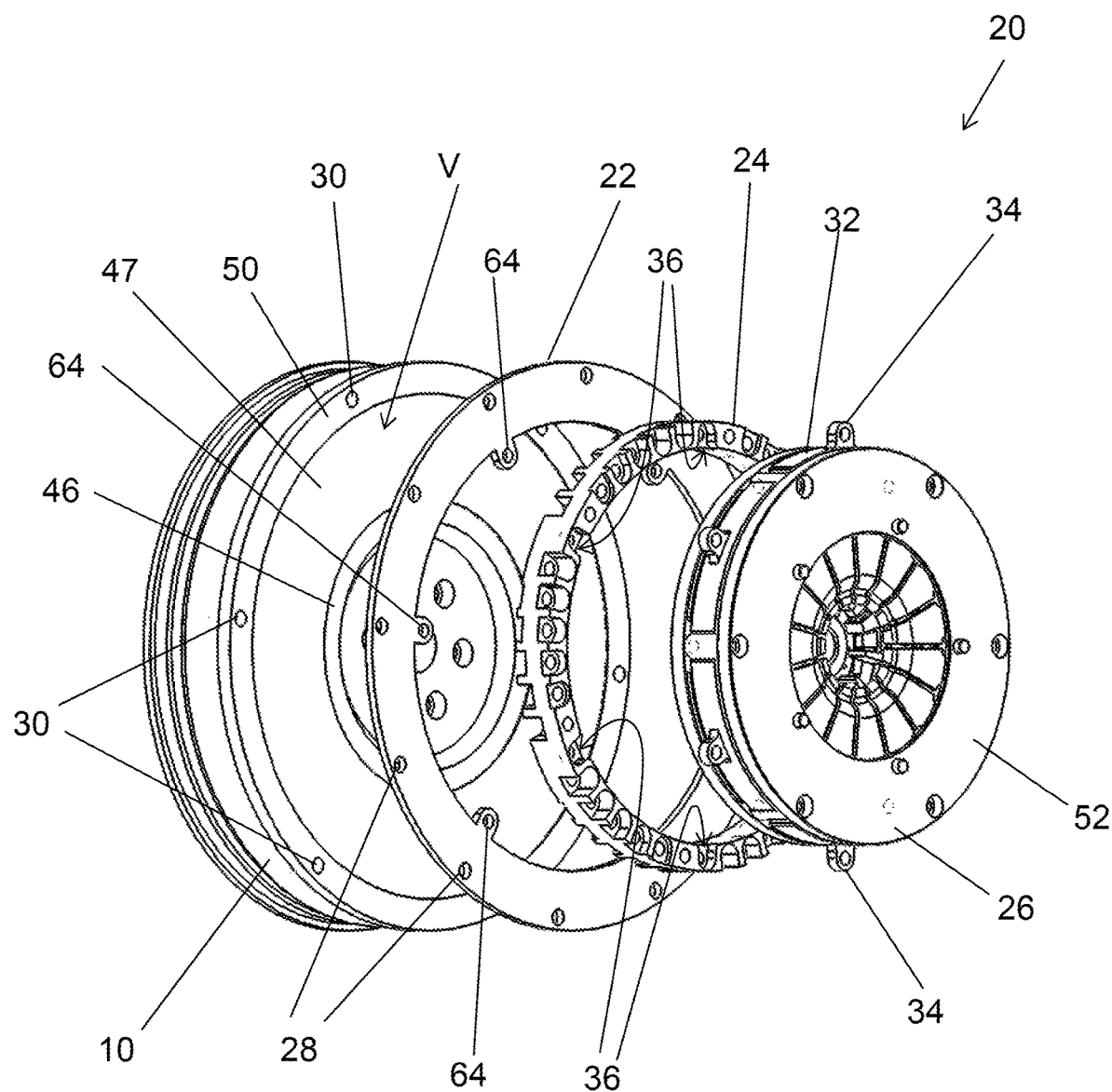
FIG. 3 is an exploded view of the FIG. 1 arrangement.

FIG. 3 is an exploded view of the flywheel 10 and the clutch assembly 20 of FIGS. 1 and 2 and shows that the connection ring 22 includes a plurality of openings 28 through which fasteners can extend for threaded connection with openings 30 in the flywheel 10. There are a greater number of openings 28 in the connection ring 22 compared to the number of openings 30 in the flywheel 10, so that the ring 22 can fit to other forms of flywheel that have openings at different positions, or different numbers of openings.

The clutch 26 of FIG. 3 attaches to the spacer 24. For this, the outer periphery 32 of the clutch 26 includes a plurality of lugs 34 for receipt within a corresponding plurality of connection recesses 36 in the spacer 24. The connection recesses 36 include threaded openings 38 (see FIG. 6) for receipt of threaded fasteners to fasten the lugs 34 within the recesses 36 and thus to fasten the clutch 26 to the spacer 24. The external periphery of the lugs 34 have a complementary shape to the internal wall of the recesses 36 so that the lugs 34 are a snug or close fit within the recesses 36.

In the embodiment illustrated in the figures, it is not a requirement that the clutch 26 have a specific rotational orientation to engage the spacer 24 but rather, the lugs 34 of the clutch 26 will fit into any of the recesses 36 of the spacer 24. This simplifies connection of the clutch 26 to the spacer 24.

Figure 5:
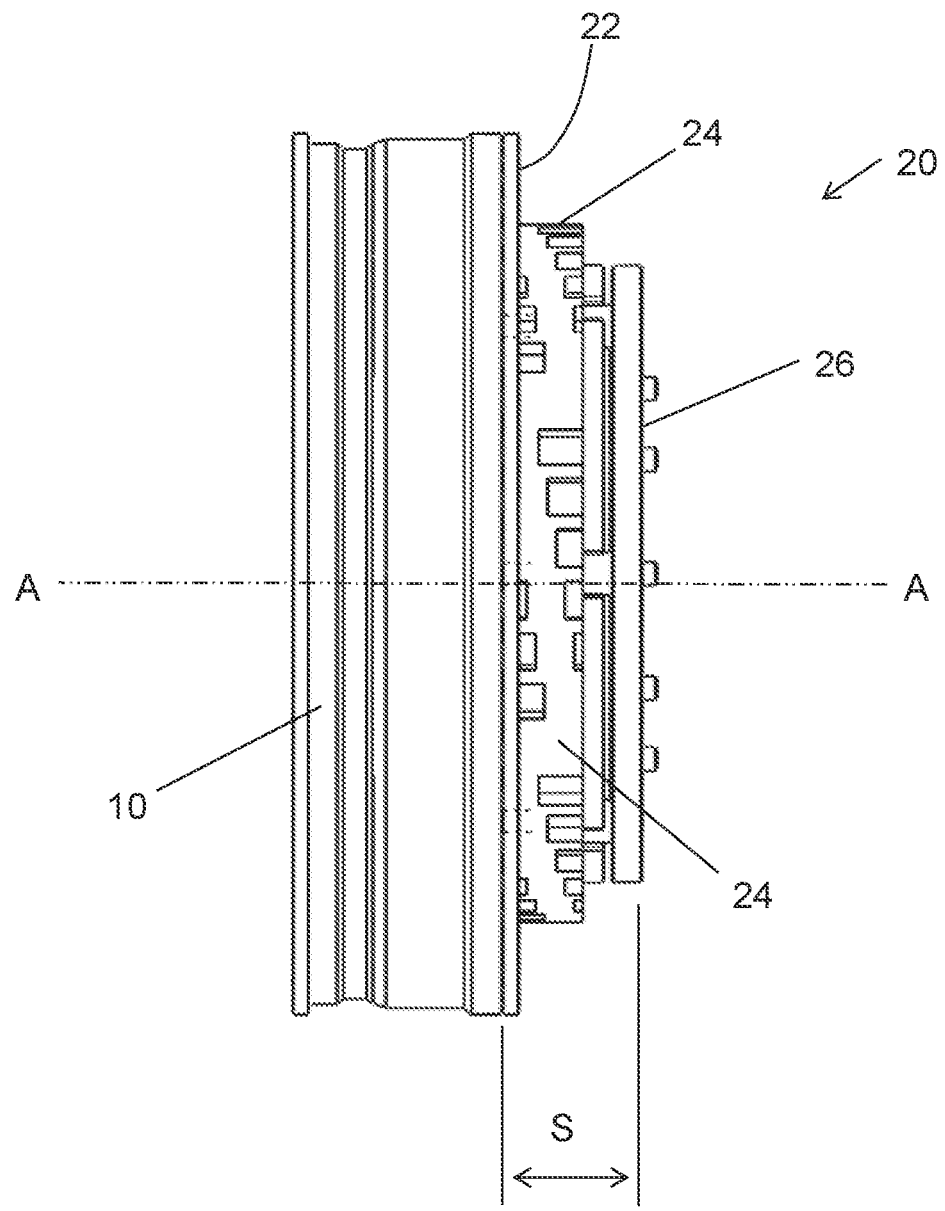
FIG. 5 is a side view of the FIG. 1 arrangement.

With the clutch 26 connected to the spacer 24, the connection ring 22 can be connected to the spacer 24 and then to the flywheel 10. In the arrangement illustrated, the spacer 24 provides for 12 different connection orientations for the connection ring 22 and thus 12 different options to vary the axial spacing of the clutch 26 with respect to the flywheel 10. The variation in axial spacing is represented in FIGS. 5, 10 and 11 with reference to the spacing S between the rear face 50 (see FIG. 3) of the flywheel 10 and the trailing face 52 of the clutch 26. As explained earlier herein, in the clutch assembly 20 of the present invention, the clutch 26 is a sealed clutch, so that there is no requirement for the friction material of clutch 26 to frictionally engage the flywheel 10. In traditional clutch assemblies, the friction material of the clutch would frictionally engage surface 47 (see FIG. 3) of the flywheel 10. However, the sealed clutch 26 does not engage the surface 47 as explained below.

Figure 4:
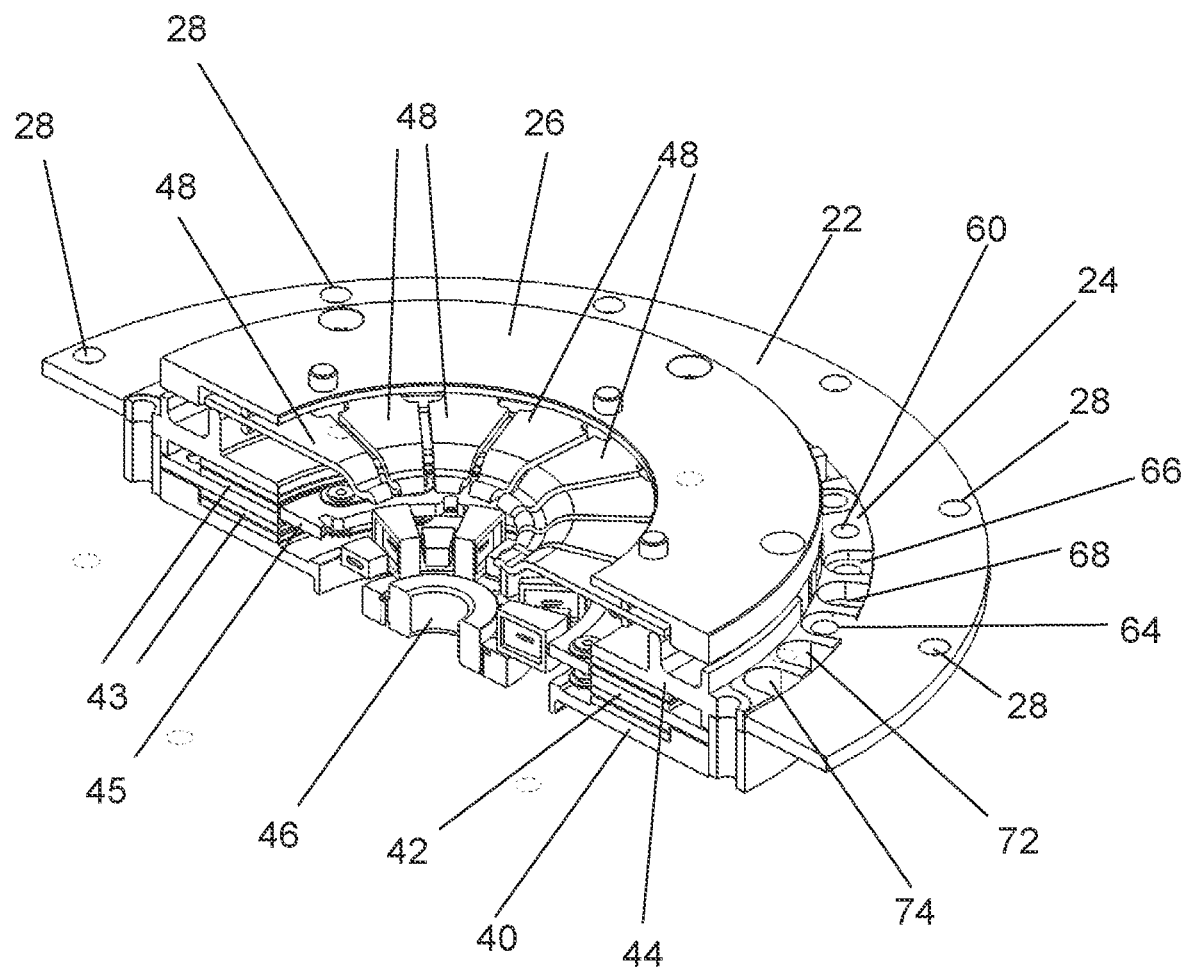
FIG. 4 is a cross-sectional view of a clutch assembly according to the present invention.

FIG. 4 illustrates a cross-sectional view through the central axis of the clutch 26 and shows a clutch base plate 40, a clutch intermediate plate 42 and a pressure plate 44. Friction linings 43 of clutch plate 45 are located between the base plate 40 and the intermediate plate 42, and between the intermediate plate 42 and the pressure plate 44 and the clutch plate 45 extends to a centre hub 46. The centre hub 46 is, in use, in splined connection with a transmission shaft (not shown) that extends to the transmission of the vehicle. The operation of the sealed clutch 26 would be evident to a person skilled in the art, but briefly, the clutch assembly 20 connects to the flywheel 10 on one side (via the connection ring 22 and the spacer 24), and to the transmission shaft on the other side (via the centre hub 46). In the state shown in FIG. 4, the friction linings 43 are in firm frictional engagement with (or are sandwiched between) the pressure plate 44, the intermediate plate 42 and the base plate 40, so that torque delivered from the flywheel 10 through the connection ring 22 to the clutch 26, rotates the clutch 26, so that the clutch plates 45 rotate and drive rotation of the centre hub 46 and the connected transmission shaft to drive the transmission of the vehicle. To disengage the clutch 26, pressure is applied to the diaphragm springs 48 at a radial inward portion of the springs 48, which allows the pressure plate 44 to lift slightly and thus to frictionally disengage the friction linings 43 of the clutch plate 45 so that the clutch plate 45 no longer drives the centre hub 46 and the transmission shaft connected to the hub 46, so that the transmission of the vehicle is no longer driven.

Thus, rotation of the clutch plate 45 is as a result of frictional engagement within the clutch 26 and, in contrast with traditional clutches, no frictional contact with the flywheel 10 is required. Because of this, the arrangement of the invention has major benefits, in that the requirement to refurbish the friction surface of the flywheel or to replace the entire flywheel is no longer necessary, or is no longer as frequent as with traditional clutches.

As previously described, there is a specific amount of space or volume between the flywheel and the transmission of a vehicle that a traditional clutch occupies. This envelope that the clutch occupies varies depending on the make and model of the vehicle. In order for the clutch assembly of the invention to fit within multiple different envelopes, the clutch assembly of the present invention is variable in its axial dimension by the use of the spacer 24. With reference to FIG. 5, the assembled view of FIG. 1 is shown in side view and shows the spacing S between the rear face 50 (see also FIG. 3) of the flywheel 10 to which the connection ring 22 attaches, and the trailing face 52 of the clutch 26. It is the spacing S that the clutch assembly 20 can vary so as to be suitable to replace different styles of traditional clutches and thus to suit the different space or volume envelopes within which the clutch assembly 20 needs to be installed. It is to be noted that in FIG. 3, the face 50 of the flywheel 10 is part of the ring 11 of the flywheel and that the surface 47 radially inboard of the ring 11 is recessed well below the face 50. That is, the ring 11 defines an internal space or void V into and out of which the clutch 26 and the spacer 24 can move axially. With reference to FIG. 5 and with reference to the discussion that follows, it will become apparent that the spacer 24 and the clutch 26 can both move to the left or right along the axis A as required to fit the clutch assembly 20 within the working envelope available.

Figure 6:
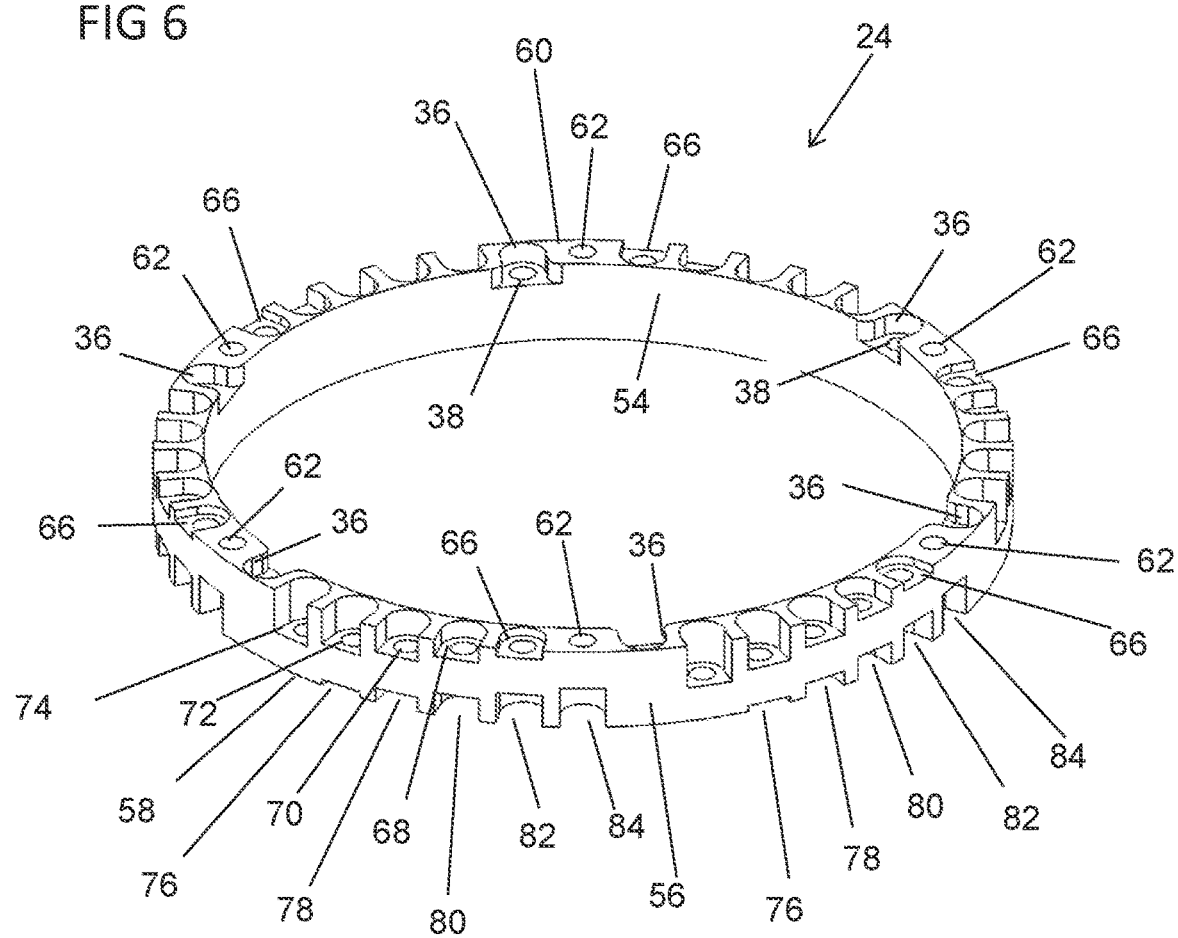
FIG. 6 is a perspective view of a spacer according to the present invention.
Figure 7:
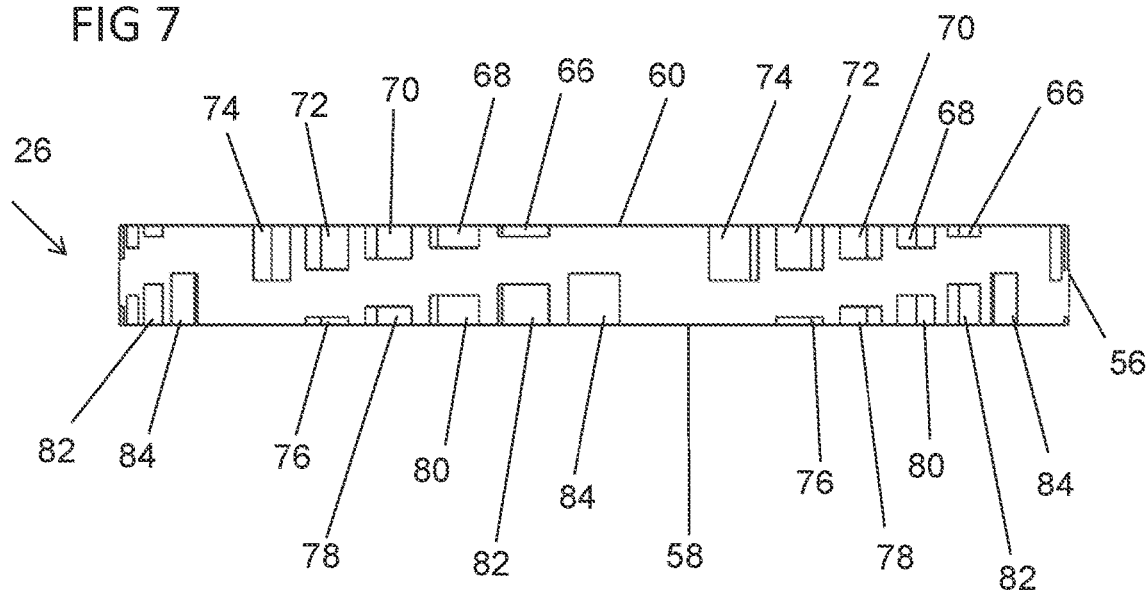
FIG. 7 is a side view of the spacer of FIG. 6.

FIGS. 6 and 7 are perspective and side views of the spacer 24. The spacer 24 has an inside cylindrical surface 54 and an outside cylindrical surface 56 and opposite leading and trailing surfaces 58 and 60. Six connection recesses 36 are provided for accepting the lugs 34 of the clutch 26, and it can be seen from FIG. 6, that the connection recesses 36 open radially inwardly and through the inside surface 54. Each of the connection recesses 36 includes a threaded opening 38 for receipt of a threaded fastener to secure the clutch 26 to the spacer 24.

The spacer 24 further includes a plurality of connection openings 62 to which lugs 64 of the connection ring 22 can be overlaid for connection of the ring 22 to the spacer 24. The openings 62 are thus formed in the trailing surface 60 of the spacer 24.

The spacer 24 further includes a plurality of connection recesses 66 that are spaced equidistantly about the spacer 24 and that extend axially inboard of the trailing surface 60 a first axial distance. The connection recesses 66 form a first set of such recesses to which the six lugs 64 of the connection ring 22 can enter and connect. The connection recesses 66 are spaced about the trailing surface 60 of the spacer 24 to match precisely with the lugs 64 of the connection ring 22, so that each lug 64 extends to the same depth from the trailing surface 60.

Formed within the trailing surface 60 of the spacer 24 are a further four sets of connection recesses 68, 70, 72 and 74. It can be seen that each of the connection recesses 66 to 74 extends inboard of the trailing surface 60 and opens through the outside surface 56 of the spacer 24. The connection recesses of these sets of connection recesses are spaced apart equidistantly about the trailing surface 60 of the spacer 24 and as is evident in FIG. 6, the individual connection recesses of each set of connection recesses have the same axial depth, but each set of connection recesses has a different axial depth to another set. That is, the connection recesses in the set of connection recesses 66 all have the same axial depth, but the connection recesses 66 have a different axial depth to the connection recesses in the set of connection recesses 70.

In the illustrated embodiment, the individual connection recesses of each set of connection recesses 66, 68, 70, 72 and 74 are positioned adjacent to each other and as shown in FIG. 6, the connection recesses are arranged in groups in clockwise direction from shallowest axial depth (connection recesses 66) to deepest axial depth (connection recesses 74). There are six groups of these connection recesses. Thus, by rotation of the connection ring 22 relative to the spacer 24, the lugs 64 of the connection ring 22 can be inserted into the six recesses of any one of the sets of connection recesses 66, 68, 70, 72 and 74 and the connection ring 22 will rest at a different axial depth relative to the spacer 24 depending on the particular set of connection recesses selected. With reference to FIG. 4, the lugs 64 of the connection ring 22 are inserted into the middle set of connection recesses 70 (not numbered by between connection recesses 68 and 72).

It will be evident from the figures, that the selection of the respective connection recesses that the lugs 64 of the connection ring 22 are inserted into will determine the spacing S, i.e., the distance between the rear face 50 of the flywheel 10 and the trailing face 52 of the clutch 26. With reference to FIG. 4, if the ring 22 were to be rotated so that the lugs 64 were received in the connection recesses 74, then the ring 22 would sit lower on the clutch 26 than illustrated and so the spacing S would increase. Conversely, if the connection ring 22 were rotated so that the lugs 64 were received within the connection recesses 66, the connection ring 22 would sit higher relative to the clutch 26 and so the spacing S would decrease. Intermediate positions can be achieved through connection of the lugs 64 with the connection recesses 68, 70 or 72.

As illustrated in FIGS. 6 and 7, in addition to the connection openings 62 and the connection recesses 66 to 74 that extend axially inboard of the trailing surface 60, the spacer 24 includes further connection openings (not shown) that are equivalent to the connection openings 62, as well as further connection recesses 76, 78, 80, 82 and 84 which extend axially inboard of the leading surface 58 of the spacer 24. The further connection openings that are not shown are located axially opposite the connection recesses 74. These further connection openings and connection recesses provide additional connection points for the connection ring 22 to connect to the spacer 24.

The connection recesses 76, 78, 80, 82 and 84 are formed in sets of six recesses in the same manner as the connection recesses 66, 68, 70, 72 and 74, and while the individual connection recesses of the sets of connection recesses 76, 78, 80, 82 and 84 are arranged adjacent to each other, the arrangement is the opposite to the connection recesses 66, 68, 70, 72 and 74, in that the connection recesses are arranged in clockwise direction from deepest axial depth (connection recesses 84) to shallowest axial depth (connection recesses 76). This enables the axial depth or height of the spacer 24 to be minimised, by the deepest connection recesses 84 being axially adjacent or axially opposed to the connection openings 62 and then the next deepest connection recesses 82 being axially adjacent or axially opposed to the shallowest connection recesses 66. This axial alignment is clearly evident in FIG. 7. It is to be noted that in the spacer 24, the openings that are provided in the connection recesses for receipt of threaded fasteners (see the opening 38 in FIG. 6 for example), extend fully between opposing recesses, so that separate blind openings for each connection recess are not required.

Figure 8:
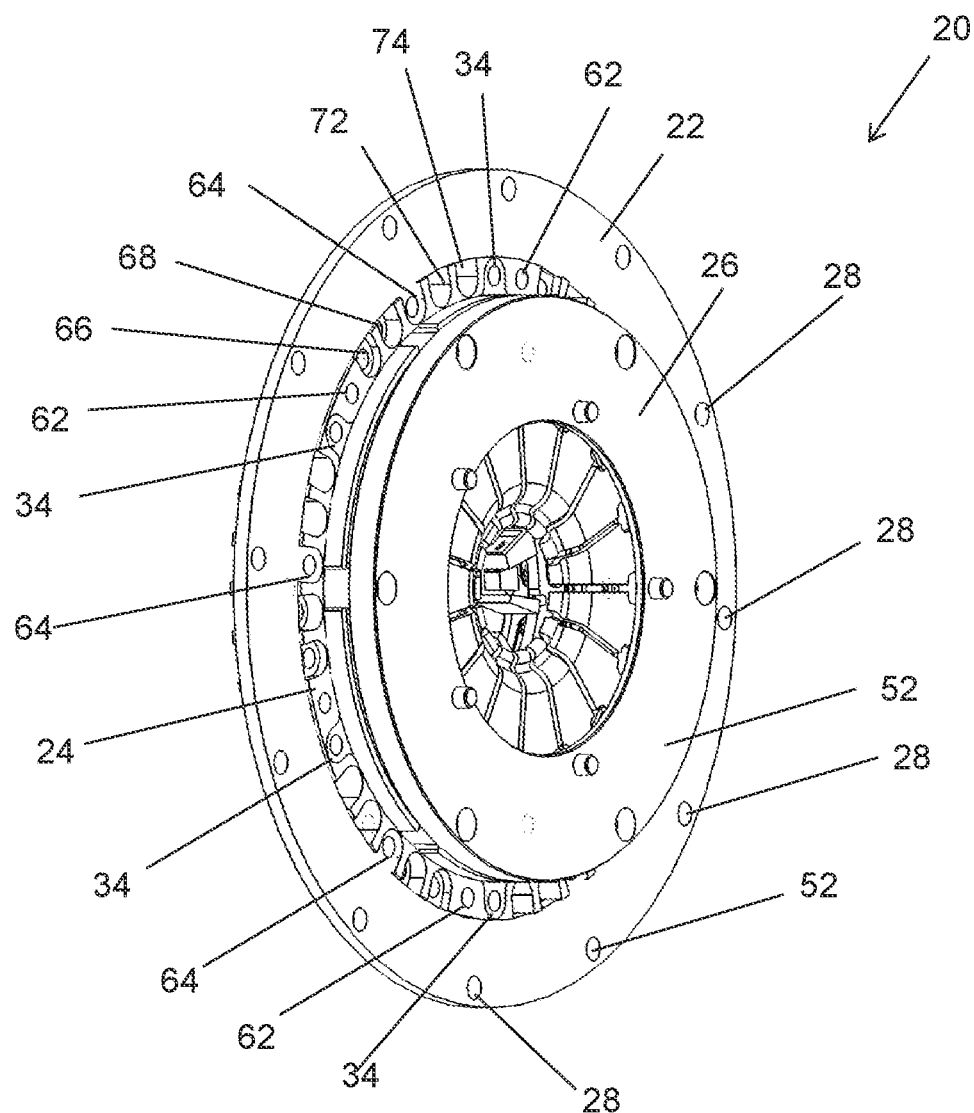
FIGS. 8 and 9 are perspective views of clutch assemblies according to the present invention.
Figure 9:
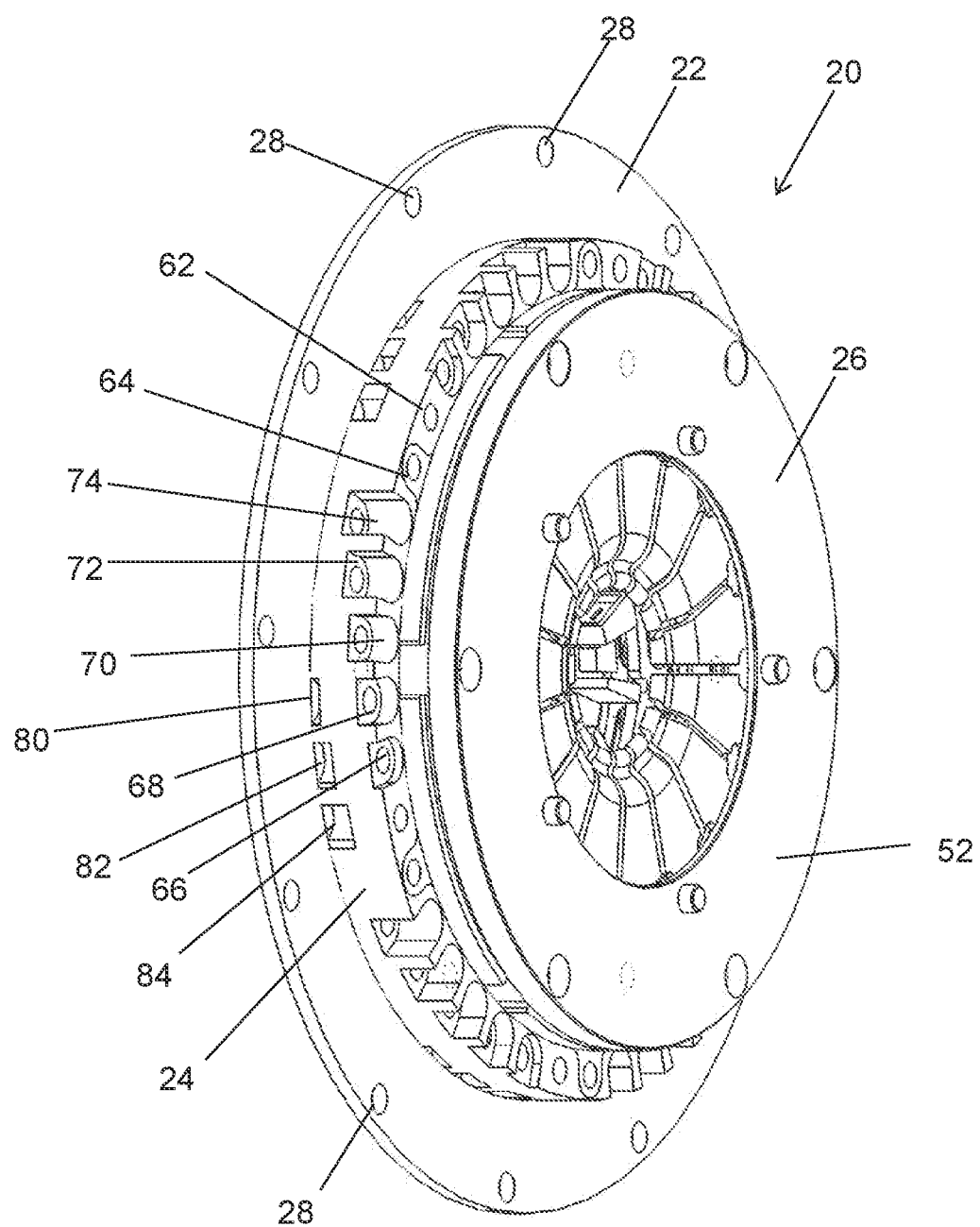

The connection ring 22 can thus be positioned in any of the six different positions available on the trailing surface 60, as well as the further six different positions available on the leading surface 58. These different connections are shown in FIGS. 8 and 9 in which FIG. 8 shows connection of the connection ring 22 to connection recesses of the trailing surface 60, while FIG. 9 shows connection to the leading surface 58. The lugs 64 of the connection ring 22 can be seen in FIG. 8, where the lugs 64 are received within the connection recesses 70, whereas in FIG. 9, the lugs are not visible as being obscured by the connection ring 22 itself. However, a comparison of FIGS. 8 and 9 shows that the face 52 of the clutch 26 sits further away from the connection ring 22 in FIG. 9 than it does in FIG. 8 and consequently, the clutch 26 will be in closer proximity to the flywheel 10 in the FIG. 8 arrangement than in the FIG. 9 arrangement. FIGS. 10 and 11 clearly illustrate the different position of the face 52 of the clutch 26 relative to the connection ring 22 (the flywheel 10 is not shown in FIGS. 10 and 11) in which FIG. 10 corresponds to the FIG. 8 arrangement and FIG. 11 corresponds to the FIG. 9 arrangement. In FIG. 10, the spacing $S_{10}$ is less than $S_{11}$. It will be appreciated, that once the connection ring 22 is connected to the flywheel 10, the relative spacing between the flywheel 10 and the face 52 of the clutch 26 differs between FIGS. 10 and 11.

It will be appreciated that while five sets of connection recesses (recesses 66, 68, 70, 72, 74) have been shown in the figures, a greater or lesser number of sets of connection recesses could be provided. However, the arrangement illustrated in the figures is expected to fit within the clutch envelope of approximately 90% of production passenger vehicles and so including a greater number of sets of connection recesses does not add greatly to the utility of the clutch assembly.

It will be appreciated that the clutch assembly 20 has been described in relation to the figures as requiring a connection ring 22, but it will be understood that in a different form of the invention, the connection ring 22 could be omitted and the spacer 24 could be configured for direct connection to the flywheel 10. In that arrangement, the connection recesses 36 might be configured for facilitating variation in the axial spacing of the clutch 26 from the flywheel 10, such as by forming multiple sets of different depth connection recesses 36 in the same manner as the different sets of the connection recesses 66 to 74. In that arrangement, the rotational orientation of the clutch 26 relative to the spacer 24 would determine the axial spacing of the clutch 26 relative to the flywheel 10. The spacer 24 could connect directly to the flywheel 10 by an integral ring that projects radially outwardly from the outside surface 56 of the spacer 24 or alternatively, by lugs that project radially outwardly from the outside surface 56. Other arrangements could be adopted.

Figure 12:
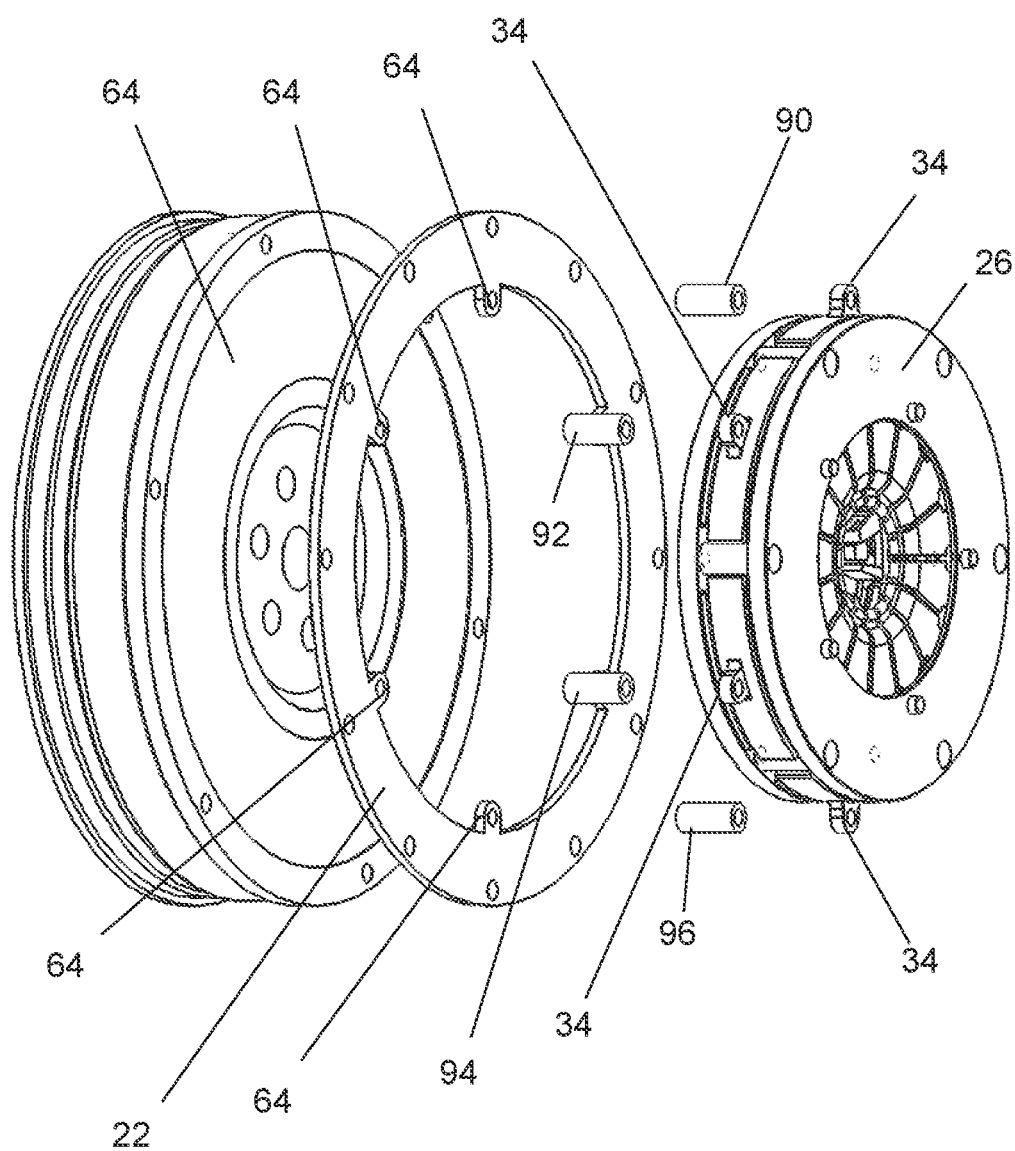
FIG. 12 is an exploded view of an assembly showing a flywheel to which a clutch assembly according to an alternative embodiment of the present invention is connected.

In FIG. 12, an alternative arrangement is illustrated in which a spacer that is different from the spacer 24 of the earlier figures is employed. Given that only the spacer of FIG. 12 is different between FIGS. 1 to 11 and FIG. 12, the same reference numerals used in FIGS. 1 to 11 are used in FIG. 12.

The clutch assembly of FIG. 12 comprises a spacer in the form of a series of individual elements or blocks 90, 92, 94, 96, as opposed to a unitary spacer ring 24. In the embodiment shown in FIG. 12, six blocks are used however only four are visible. The blocks 90, 92, 94, 96 are positioned between the lugs 34 of the clutch 26, and the six lugs 64 of the connection ring 22. The blocks 90, 92, 94, 96, have a hollow central body. Threaded fasteners (not shown) extend through the lugs 34 of the clutch 26, the blocks 90, 92, 94, 96, and the lugs 64 of the connection ring 22 to securely connect the clutch 26 to the connection ring 22. Although the blocks 90, 92, 94, 96, shown are cylindrical in shape, they can be in any suitable shape.

The blocks 90, 92, 94, 96 are used to position the clutch 26 at a desired axial distance from the flywheel 10. Although not shown in the drawings, the clutch assembly 20 may come in a kit form comprising a plurality of differently dimensioned block sets to position the clutch 26 at different axial distances from the flywheel 10.

In a further alternative embodiment to that of FIG. 12, the blocks 90, 92, 94, 96, may be connected directly to the flywheel 10, and the clutch 26 may be connected directly to the blocks 90, 92, 94, 96. In this alternative embodiment, the connection ring 22 is not used.

The use of blocks 90, 92, 94, 96 to adjust the axial distance of the clutch 26 from the flywheel 10 allows for modification of the positioning of the clutch 26 relative to the flywheel where a spacer 24, and/or a connection ring 22 cannot be used. This does not preclude the blocks 90, 92, 94, 96 from being used with either of these components. In a further alternative embodiment not shown in the drawings, the blocks 90, 92, 94, 96 may be positioned between the clutch 26 and the spacer 24 to provide a user with an additional number of clutch 26 positions.

The invention illustrated in the figures is anticipated to reduce inventory for manufacturers, suppliers and automotive workshops significantly. It is also expected to allow automotive workshops to stock sufficient parts that they will not need to order replacement clutch assemblies each time a clutch requires replacement. This will benefit consumers with reduced time for vehicle repair and will free up valuable space in automotive workshops with vehicles not remaining dormant within the workshop while clutch assemblies are delivered.

Those skilled in the art will appreciate that the invention described herein is susceptible to variations and modifications other than those specifically described. It is understood that the invention includes all such variations and modifications which fall within the spirit and scope of the present invention.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

The invention claimed is:

1. A clutch assembly comprising:
a sealed clutch,
a spacer, and
a connector,
the clutch being connected to the spacer and the spacer being connectable to a flywheel along a common axis with the connector being interposed between the spacer and the flywheel for connecting the spacer to the flywheel and the spacer facilitating connection of the clutch to the flywheel in at least two different axially spaced positions,
the connector being a connection ring and the spacer having opposite axial facing leading and trailing surfaces, the connection ring being connectable to the leading or trailing surface of the spacer and the leading or trailing surface to which the connection ring is connected having a configuration that facilitates connection of the spacer to the flywheel in the at least two different axially spaced positions,
each of the leading and trailing surfaces of the spacer having an outer surface and the configuration that facilitates connection of the clutch to the flywheel in the at least two different axially spaced positions comprises one or more connection recesses extending axially inboard of a respective outer surface and having a first axial depth, whereby the connection ring is connectable to the outer surface of the spacer at a first axial position relative to the spacer, or to the one or more connection recesses at a second and different axial position relative to the spacer.

2. A clutch assembly according to claim 1, the spacer being formed as a ring.

3. A clutch assembly according to claim 1, the spacer having an inside generally cylindrical surface defining an opening and the clutch being receivable within the opening and axial spacing of the clutch relative to the flywheel being achieved by axial movement of the clutch within the opening relative to the spacer.

4. A clutch assembly according to claim 1, whereby a first set of connection recesses has a first axial depth and a second set of connection recesses has a second axial depth, whereby the connection ring connects to the connection recesses for connection of the connection ring to the spacer and connection of the connection ring to the spacer can be made to the first set of connection recesses at the first axial position relative to the spacer or to the second set of connection recesses at the second axial spacing relative to the spacer.

5. A clutch assembly according to claim 4, the connection recesses of each set of connection recesses being grouped together with connection recesses of other sets of connection recesses to form groups of connection recesses of different axial depth.

6. A clutch assembly according to claim 4, the connection recesses being formed in each of the leading and trailing surfaces of the spacer and the axial depths of one or more of the connection recesses of the leading surface being different to the axial depths of the connection recesses of the trailing surface.

7. A clutch assembly according to claim 1, the connection recesses being formed in each of the leading and trailing surfaces of the spacer and the axial depths of one or more of the connection recesses of the leading surface being different to the axial depths of the connection recesses of the trailing surface.

8. A clutch assembly according to claim 7, the groups of connection recesses in the leading surface overlying or axially opposing the groups of connection recesses in the trailing surface and the progression from shallowest axial depth to deepest axial depth in the leading surface being opposite to the progression from shallowest axial depth to deepest axial depth in the trailing surface.

9. A clutch assembly according to claim 1, the spacer having an outside generally cylindrical surface and the connection recesses being open through the outside surface and the connection ring including radially inwardly extending projections that extend into the connection recesses and connect to the spacer.

10. A clutch assembly comprising:
a sealed clutch,
a spacer, and
a connector,
the clutch being connected to the spacer and the spacer being connectable to a flywheel along a common axis with the connector being a connection ring interposed between the spacer and the flywheel for connecting the spacer to the flywheel and the spacer facilitating connection of the clutch to the flywheel in at least two different axially spaced positions, the spacer comprising a plurality of separate spacer elements that connect between the clutch and the connector, the plurality of separate spacer elements comprising first spacer elements having a first spacing dimension and second spacer elements having a second spacing dimension, whereby the first or second spacer elements are separately selected based on the spacing dimension required between the clutch and the flywheel to facilitate connection of the clutch to the flywheel in the at least two different axially spaced positions.

11. A kit for forming a clutch assembly according to claim 10, the kit including a including the sealed clutch, the spacer comprising the first spacer elements and the second spacer elements, and the connector.

* * * * *